United States Patent
Marchesani

Patent Number: 5,246,361
Date of Patent: Sep. 21, 1993

[54] APPARATUS FOR PRODUCING STRIATED SOAP BARS OF COMPARABLE AESTHETIC QUALITY ON BOTH INNER AND OUTER LOG FACES FOR SOAP BARS PRODUCED IN A DUAL EXTRUSION PROCESS

[75] Inventor: Cesare Marchesani, Maywood, N.J.

[73] Assignee: Lever Brothers Company, Division of Conopco, Inc., New York, N.Y.

[21] Appl. No.: 930,863

[22] Filed: Aug. 14, 1992

Related U.S. Application Data

[63] Continuation-in-part of Ser. No. 662,079, Feb. 28, 1991, abandoned.

[51] Int. Cl.⁵ .............................................. B29C 47/00
[52] U.S. Cl. ................................ 425/131.1; 264/75; 425/192 R; 425/296; 425/308; 425/463
[58] Field of Search ............... 425/131.1, 190, 192 R, 425/297, 308, 461, 464, 466, 467; 264/75, 108

[56] References Cited

U.S. PATENT DOCUMENTS

| | | | |
|---|---|---|---|
| 1,661,069 | 11/1925 | Hartung | 425/464 |
| 2,073,271 | 11/1932 | Webb | 425/464 |
| 2,149,425 | 4/1935 | Draemann | 425/464 |
| 2,638,855 | 12/1950 | Maldari | 425/464 |
| 2,945,739 | 7/1960 | Lehmicke | 425/461 |
| 2,968,835 | 1/1961 | Weston, Jr. et al. | 425/461 |
| 3,168,509 | 2/1965 | Juel | 264/108 |
| 3,485,905 | 12/1969 | Compa et al. | 264/75 |
| 3,676,538 | 7/1972 | Patterson | 264/75 |
| 3,784,533 | 1/1974 | Mach | 425/296 |
| 3,857,662 | 12/1974 | Ratz | 425/380 |
| 3,860,036 | 1/1975 | Newman, Jr. | 425/131.1 |
| 3,868,208 | 2/1975 | Fischer | 425/380 |
| 4,738,609 | 4/1988 | Marchesani | 264/75 |
| 5,059,371 | 10/1991 | Saheki et al. | 264/108 |

*Primary Examiner*—David A. Simmons
*Assistant Examiner*—William J. Matney, Jr.
*Attorney, Agent, or Firm*—Ronald A. Koatz

[57] ABSTRACT

The present invention provides a novel eyeplate apparatus which permits logs to be extruded in a dual extrusion process whereby the aesthetic quality of the inner and outer log faces of the extruded logs is comparable. In a preferred embodiment, the eyeplate is used in combination with upper and lower eyeplate baffles in the nosecone of a plodder.

11 Claims, 4 Drawing Sheets

APPARATUS FOR PRODUCING STRIATED SOAP BARS OF COMPARABLE AESTHETIC QUALITY ON BOTH INNER AND OUTER LOG FACES FOR SOAP BARS PRODUCED IN A DUAL EXTRUSION PROCESS

CROSS REFERENCES

This is a continuation-in-part of Ser. No. 07/662,079, filed Feb. 28, 1991 now abandoned.

BACKGROUND OF THE INVENTION

1. Field of the Invention

The present invention relates to a novel apparatus used in a dual extrusion process for the preparation of soap which apparatus permits the production of soap bars having comparable aesthetic quality on both the inner and outer face of the soap log. In particular, the invention relates to the use of a novel eyeplate in the dual extrusion process providing the above-described benefits. The invention further relates to a novel process for producing soap bars in a dual extrusion process wherein both faces of the bar have comparable aesthetic quality and which process comprises the use of the novel eyeplate.

In a preferred embodiment of the invention, the novel eyeplate is used in combination with upper and lower eyeplate baffles in the nosecone of a plodder.

2. Background

Striated soap has apparently become very popular with the consumer due to the aesthetics of the soap.

Due to limitations imposed by the Federal Drug Administration (FDA) in 1976 on the type of coloring system which can be used in the preparation of soap, it has proved very difficult to obtain desired striation aesthetics. Specifically, using the colors which are required under FDA regulations, the color mix has a tendency with time to blend throughout the bar (thereby reducing the contrast between the striation and the rest of the soap) and thus reduce the aesthetic quality of the soap. In addition, it has been found that striated soap smears when passed through an orifice plate of an extruder.

Striated or variegated soap may be produced in various ways. Colored liquid may be mixed with soap filaments in a worm plodder prior to extrusion of the billet as is taught in U.S. Pat. No. 3,485,905 to Compa et al. It has also been disclosed to make variegated soap by introducing colored liquid through the worm of a plodder as described in U.S. Pat. No. 3,676,538. It has further been proposed to make variegated soap by bringing together differently colored soaps from separate plodders or the like in a mixing device which extrudes the mixture as a continuous billet. In all of these devices, a soap billet of generally rectangular cross-section is extruded from the cone of the final plodder.

It has been observed that the color at the surface of the billets of most variegated soaps extruded from plodders is usually diffused and the striations indistinct at the surface. This problem has become even more acute since the FDA restrictions discussed above on the type of coloring systems which can be used during preparation of the soap.

In order to highlight the striations, a number of solutions have been suggested by the art.

U.S. Pat. No. 3,485,905 to Compa describes a process in which filaments of soap are compacted and forced by a rotating worm in a cylinder through a nozzle which preferably has attached cutting edges to shave-off 1/32 to 1/16 of an inch of the surface as the bar is extruded through the nozzle. There is no discussion of the flow pattern of soap through the plodder or nosecone and no mention of an eyeplate with a relief system for controlling the flow of soap or the effect on the aesthetics of the soap bar the flow pattern may have.

U.S. Pat. No. 3,857,662 to Ratz teaches a process and apparatus for producing striated soap in which soap is extruded as side by side billets through a die having closely spaced openings corresponding to the billet cross sections. The die further has slots adjacent to the outer sides of the openings for shaving away outer surface layers. In this patent, a narrow land 18 is used to separate the billets. This narrow land has no opening or port through which soap can flow to provide relief in the flow pattern when the billets are extruded through openings in the middle. There is no discussion or appreciation of what effect a relief in the flow pattern may have on the aesthetics of the log, particularly on the inner faces of the logs.

U.S. Pat. No. 3,784,533 to Mach teaches a method and apparatus in which soap is first extruded through a nozzle having an opening and then glossed as it passes through the opening in order to impart gloss. Again, there is no orifice or port in the middle where the soap is extruded into two or more bars and no recognition of how such an orifice might affect flow patterns and the aesthetics of the inner log face.

U.S. Pat. No. 3,868,208 to Fischer teaches a nozzle plate assembly for obtaining an improved surface finish on high speed extrusions without requiring trimming.

In none of these references is there provided an apparatus or method for overcoming the problem of two perceptibly different surface patterns between inner and outer log faces which is a well known phenomenon that is typically associated with striated soap produced in conventional dual extrusion processes.

Thus, it would be greatly desirable to find an apparatus or method which could overcome the problem of different surface patterns produced in dual extrusion processes and which could produce bars with clearly defined and comparable surface patterns on both the inner and outer log surfaces.

SUMMARY OF THE INVENTION

Applicants have now found an apparatus and a method which overcomes the problem of perceptibly different surface patterns on inner and outer log faces of soap bars produced in a dual extrusion process.

In particular, the present invention provides a novel eyeplate which comprises two or more extrusion outlets for forming striated logs and three or more extrusion relief outlets for relieving and equalizing the surface drag (caused by the flow of the soap through the plodder) on the dual extruded log's inner and outer surface. Two extrusion relief outlets are located on the eyeplate on the outside of the log extrusion outlets and one relief outlet is found between the two log extrusion outlets.

The relief outlets comprise plates which are inserted into a generally rectangular plate holding the relief plates. The generally rectangular plate holding the relief outlet plates (which also define the extrusion outlets) is designed so that it can be readily removed and inserted into the generally cylindrical eyeplate. In this manner, different rectangular plates containing different number of relief outlet plates can be readily interchanged.

The relief outlet plates are defined by a generally longitudinal port o orifice in the center of the plate running generally along the entire length of the plate and into which soap flows and is then extruded as a convoluted and flexible soap ribbon which may be recycled or discarded. The plate is tapered from the outer edges on both sides into the middle such that the central opening is recessed and the soap flow first hits the outer ends of the plate and slopes downwardly towards the center as is schematically shown in FIG. 5.

This feature provides even further relief which, while applicants do not wish to be bound by theory, applicants believe to be the reason behind the improved aesthetics found in the log faces.

In a preferred embodiment of the invention the wall of the relief plate forming the relief outlet through which the soap passes are alternately tapered and straight so that the soap which is extruded from the relief outlet is flexible and not rigid. The flexibility in the soap ribbon is preferred to enhance the efficiency of the rework conveying operation.

In another preferred embodiment of the invention, upper and lower eyeplate baffles are provided in the nosecone of the plodder to effect a change in the soap flow from a cylindrical to a rectangular and horizontal cross-section. This change in flow pattern together with the perpendicular position of all the extrusion outlets on the eyeplate is believed to even further provide well defined striations on both the inner and outer log faces of bars extruded through this dual extrusion process.

The baffles are designed to be an integral part of the eyeplate and are generally attached to the plate with screws (although it is possible to design a one-piece eyeplate with baffles affixed). When upper and lower plate baffles are used, it is also not required that the eyeplate apparatus contain a middle relief between the two extrusion outlets.

DETAILED DESCRIPTION OF THE INVENTION

The subject invention provides a novel apparatus whereby soap can be extruded in a dual-extrusion process to produce a bar of comparable aesthetic quality on both inner and outer log faces of the extruded bars. While not wishing to be bound by theory, it is believed that the enhanced aesthetic effect results from a reduction in the drag flow of the soap as it passes from the nosecone of the plodder to the eyeplate. In turn, this reduced drag is believed to be produced by a novel eyeplate in which at least three extrusion relief outlets are provided and, in particular, one extrusion relief outlet between the two log extrusion outlets.

Figure 5:
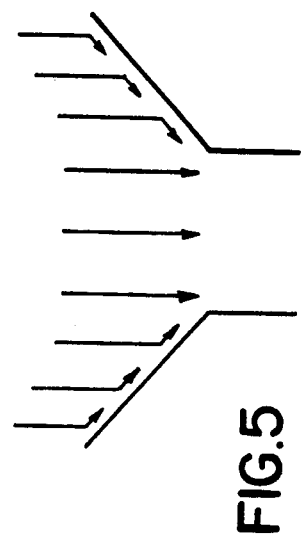
FIG. 5 is a schematic view of the flow of soap through the central opening in the relief outlet plate.

In a preferred embodiment of the invention, the plates defining the relief outlets are designed so that the outer edges of the plate (that is edges removed from the central orifice or port) protrude furthest out to the flow of soap coming from the cone towards the eyeplate and are first to come into contact with the soap. The relief plates are tapered so that the plate slopes downwardly inwardly to the center portal which is furthest from the flow. Thus, the outer edges of the plate act as a "mini-baffle" to further regulate fluid flow and reduce drag as the soap approaches the eyeplate. This is graphically demonstrated by FIG. 5.

In another preferred embodiment of the invention, eye plate baffles are located strategically outside the eyeplate again to affect fluid flow and reduce drag as the soap approaches the eyeplate. When eyeplate baffles are used, it is not required that a middle relief outlet be used.

The baffles form an integral part of the eyeplate and are preferably attached to the eyeplate with screws. Of course, it is possible to form a one-piece plate in which the baffles are affixed to the eyeplate. The baffles are located at the end of the nosecone in a fixed position to the inside wall of the dual extrusion eyeplate.

The dimensions of the baffles are not critical and will depend on the size of the cone and the length of the cone. The only design requirement is that the baffles be sufficiently large that they effect the flow pattern from the cylindrical flow of the nosecone to a horizontal flow pattern.

In another preferred embodiment of the invention the walls defining either side of the portal in the relief outlets are designed to be alternately tapered and straight such that the soap coming through is extruded into a flexible convoluted soap ribbon form. The convoluted form is preferable to the straight soap ribbon for efficiently enhancing the rework stream conveying operations.

Another aspect of the invention is the fact that both the size of the relief outlets (that is, the outside extrusion relief outlets) and the size of the log extrusion outlets can be controlled. In addition, while not contemplated as part of the process of the subject invention, the central relief plate may be removed altogether and the eyeplate of the invention can also be used in a single extrusion process. Further, the relief plates are also designed to be inserted or removed from a generally rectangular-shaped plate and it is another aspect of the invention that the generally rectangular-shaped plate can be readily inserted or removed from the generally cylindrically-shaped eyeplate.

Figure 1:
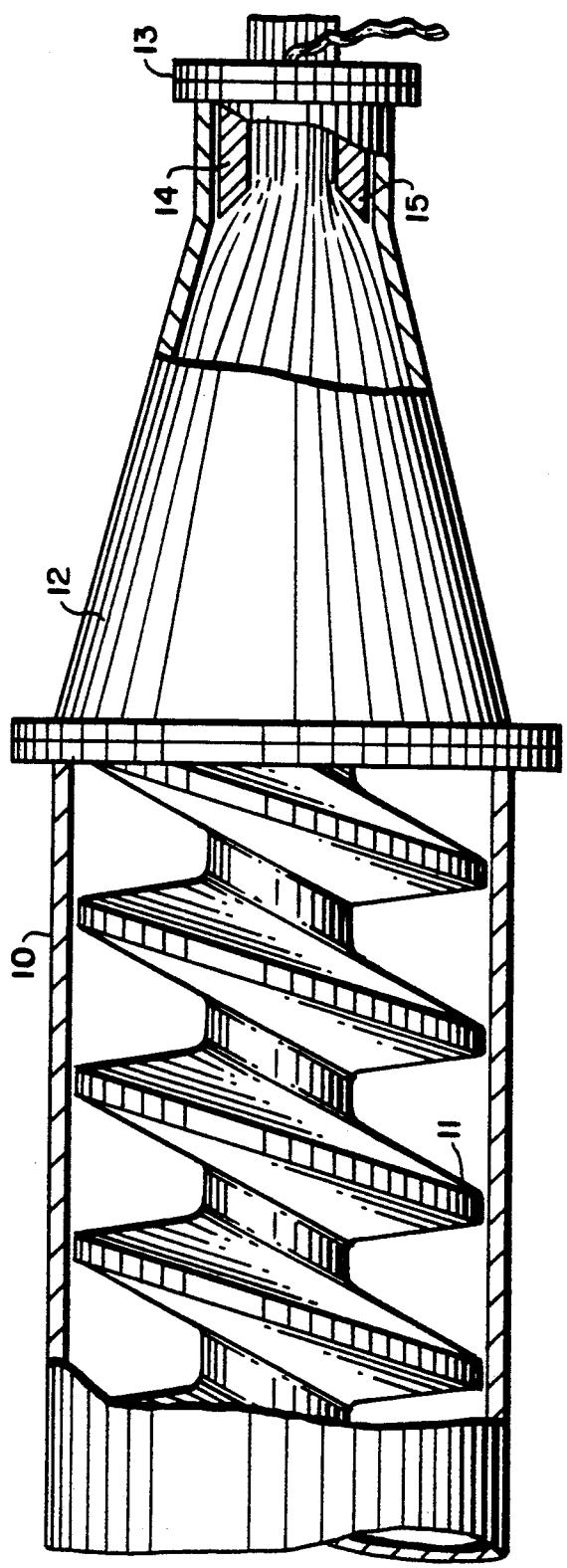
FIG. 1 is a partially fragmented view showing the discharge end of a conventional soap extruder with the upper and lower baffles strategically positioned on the dual extrusion apparatus.

Referring now to FIG. 1, this figure shows a conventional soap extruder or plodder 10 which comprises a helical screw 11 driven by of a suitable motor not shown in the figure. The soap mass containing the striating agent is compacted through plodder 10 towards a downstream coned end 12. The soap then flows out through the extrusion plate apparatus 13. In this preferred embodiment, eyeplate baffles 14 and 15 are strategically located just upstream of the extrusion plate apparatus 13. In this preferred embodiment of the invention, the eyeplate baffles are used to form and channel a horizontal soap stream through the perpendicular extrusion posts in the eyeplate. It is believed that the relationship of the horizontal soap stream passing through the generally rectangular extrusion posts further improves the aesthetic effects observable in the soap bars of the invention.

Figure 2:
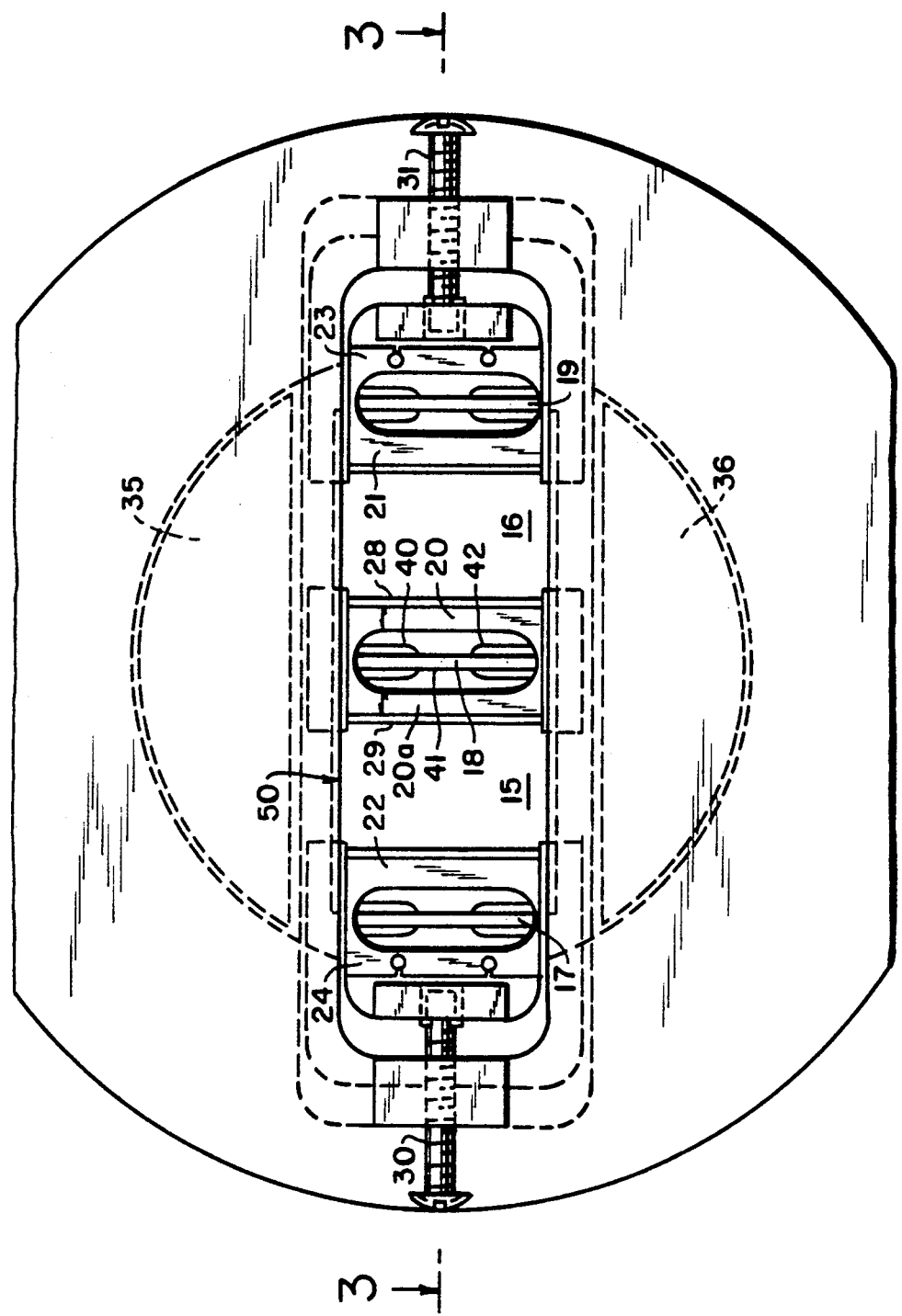
FIG. 2 is a frontal end view of the extrusion apparatus at the end of the plodder nosecone in FIG. 1.

FIG. 2 represents a frontal view of the extrusion plate apparatus 13 at the end of the plodder nosecone 12 shown in FIG. 1.

According to this preferred embodiment of the invention, the eyeplate is constructed such that three plates are inserted into a central open area (defined by a generally rectangular-shaped plate 50 which can be readily inserted or removed). The three relief plates define two log extrusion outlets 15 and 16 and at least three relief outlets 17, 18 and 19 (each relief plate comprising one relief outlet). As indicated, the relief outlets or portals 17, 18 and 19 are defined by column-like plates having slots or outlets (17, 18 and 19) running the length of the column-like plates from top to bottom. In the central plate defined by sides 20 and 20a, the outlet 18 is generally not adjustable although it is possible that a column-like plate could be designed such that two sides of the plate 20 and 20a slide apart to adjust the outlet.

It should also be appreciated that, while the figures depict generally rectangular shaped extrusion orifices (e.g., 15 and 16), the extrusion orifice may be designed to be generally cylindrical in shape or any other shape which may be known in the art.

Also, while according to the process of the invention the central plate defining portal 18 should be present to provide relief in the center and thereby provide enhanced aesthetics, it will be appreciated that the eyeplate is designed such that the central plate may be removed entirely from the generally rectangular-shaped plate 50 and a single extrusion process may be used.

When the central relief plate is present, one side of the relief plate (e.g. 20a) and the outside of a second relief plate (e.g. 22), which second relief plate is attached to the side of the generally rectangular shaped plate, together define one log extrusion outlet (e.g. 15) while the other side of the central relief plate (e.g. 20) and the outside of a third relief plate (e.g. 21), which third plate is attached to the opposite side of the generally rectangular shaped plate, together define the second log extrusion outlet (e.g. 16).

Figure 3:
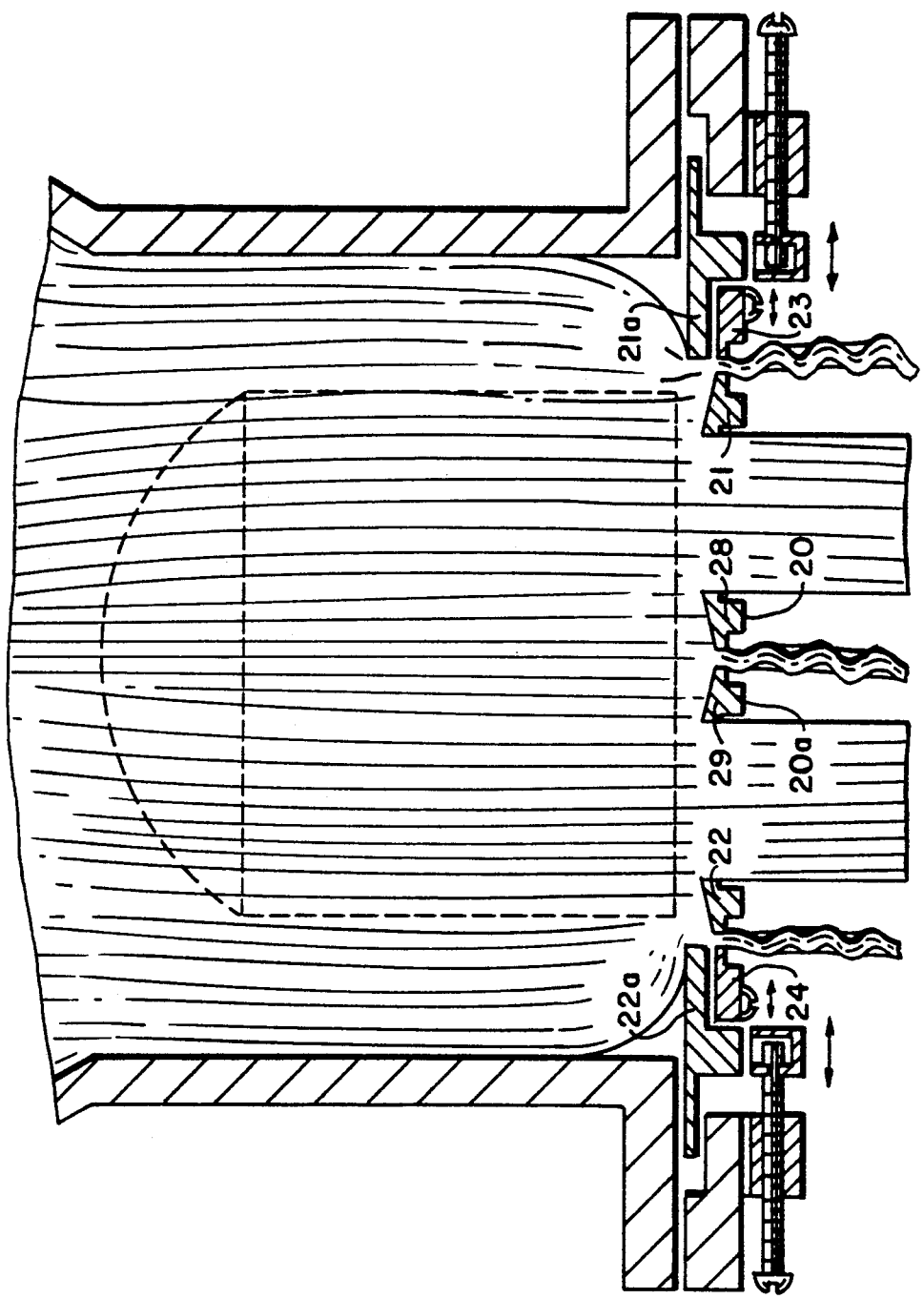
FIG. 3 is a section elevation view of FIG. 2 to illustrate the key components parts of the apparatus for achieving continuous and simultaneous dual log striation by the novel extrusion relief process.

As best viewed from FIG. 3, 22 is only one portion of the outside relief plate while the rest of the relief plate is defined by portion 22a. Similarly 21 is only one portion of the other outside relief plate while the rest of the relief plate is defined by portion 21a.

Thus, portion 22 defines both the outside of the log extrusion outlet, as well as one side of the outside relief plate. The other side of the outside relief plate is defined by an adjustable extrusion relief control panel 24. Similarly, 21 defines not only the outside of one of the log extrusion outlets, but also defines one side of the other outside relief plate. The other side of the second outside relief plate is defined by an adjustable extrusion relief control panel 23. Adjustable extrusion relief control panels 23 and 24 can be adjusted to control the size of the extrusion relief outlets 17 and 19 on the sides of the eyeplate.

While the eyeplate apparatus has been described above to exemplify a dual extrusion process, it will be appreciated by one of skill in the art that more than one column-like plate (defined by 20 and 20a in FIG. 2) may be inserted into the generally rectangular-shaped plate such that three logs or more might be extruded.

It will be appreciated from FIG. 2 that in addition to adjusting the relief outlets via adjustable extrusion relief control panels 23 and 24 (shown in FIG. 3), the size of the log extrusion may also be controlled using log weight adjusting screws 30 and 31.

In the relief plate, (e.g. 20 and 20a of FIG. 2) two-headed arrows defining the width of the relief plate walls can be observed. The walls are tapered to gradually slope inward from the outside edges such that the outside edges are furthest away from outlet 18 and jut out the furthest while the inside edges approximate to the outlet are furthest in. Since the flow of soap flows in a plane perpendicular to the figure, it will be appreciated that the soap will first hit the highest protuberance (defined by the outside edges of the relief plate wall) and then curve in towards the center. While not wishing to be bound by theory, it is believed the tapering wall will help further reduce drag and establish the eve flow which accounts for the enhanced and even striations of the invention.

The angle of the slope is not critical and depends in part on the width of the column-type piece.

It can also be seen from FIG. 2, that the outside edges of the wall 28 and 29 (which are also the sides which protrude out the furthest) also may have a certain width. This width serves to control the level of eyeplate surface contact or drag on the extruded log. This width is generally designed to be about 1/16 of an inch although it may vary widely, for example, from about 1/64 of an inch to ½ inch. The greater the width, the more drag and the broader the stripe which will form on the log. Conversely, the shorter the width, the less drag and the thinner the stripe on the soap.

The orifice of the relief plate may also vary in width although it is generally preferred that the width vary from about 1/32 inch to ½ inch, preferably ⅛ inch. In practice it is preferred that the width not be smaller than ⅛ inch and the smaller the width the less sharp will be the stripes on the soap.

Finally, from FIG. 2 can also be seen a view of the upper plate baffle 35 and lower plate baffle 36 which, in a preferred embodiment of the invention, helps to direct soap flow as the soap approaches the eyeplate and helps enhance evenly distributed striation even further.

FIG. 3 is a section elevation view of FIG. 2 setting out in greater detail some of the eyeplate components defined in FIG. 2.

Central column-like relief plate defined by 20 and 20a can be seen in FIG. 3. From this figure, the slope of the plate defined by the double-headed arrows in FIG. 2 (sloping from the outside edges 28 and 29 to the central outlet 18) can also be seen.

Figure 4:
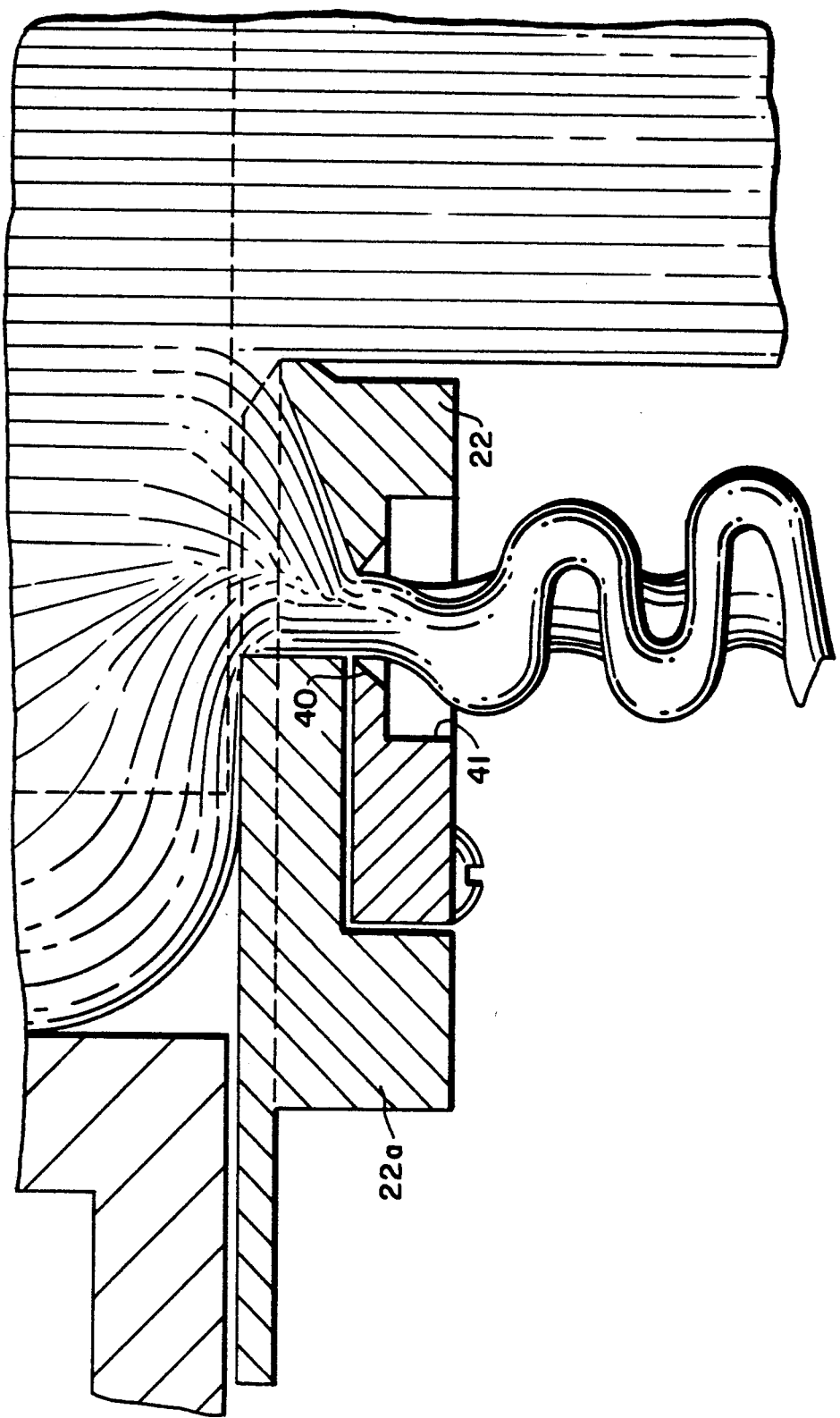
FIG. 4 is an enlarged section elevation view of one of the three relief openings in FIG. 2.

In a preferred embodiment of the invention, the walls defining each of the extrusion relief outlets are made alternatively tapered and straight such that the soap ribbon which passes through the walls comes out flexible and structurally fragile to facilitate recycling to the rework station. This can be seen both from FIG. 2 where 40 and 42 represent the tapered part of the wall and 41 represents the straight part; and from FIG. 4 where 40 again represents a tapering part of the wall at the orifice and 41 again represents a straight part.

Finally, in another aspect of the invention, all relief plates (and the extrusion outlets they define) can be readily inserted or removed from a generally rectangular-shaped plate 50 which plate in turn can be readily inserted or removed from the eyeplate.

OPERATION OF THE APPARATUS

In operation, the compacted plastic soap mass containing the striating agent is converted from a circular to a rectangular cross sectional shape by the upper and lower baffles prior to being forced through the ports (generally 5 ports) of the extrusion apparatus. Two of the ports serve to form the striated logs and the remaining serve to equalize and relieve the level of surface drag on the extruding logs' inner and outer faces.

As indicated above, the apparatus of this invention results in a striated bar which has a comparable aesthetic quality on both outer and inner log faces when used in a dual extrusion process.

More specifically, in a side by side comparison of bars where relief outlets were used relative to bars where no relief outlets were used, those bars where relief patterns were used displayed clearly superior striation patterns relative to the bar formed with no relief. When a middle relief outlet was used in addition to the two side relief outlets, even more enhanced striation was observed.

In another embodiment of the invention, the invention relates to a process for providing comparable aesthetic quality on both inner and outer log faces wherein the process involves the use of the novel apparatus.

I claim:

1. An apparatus for extruding soap comprising a plodder nosecone and an eyeplate wherein the plodder nosecone comprises eyeplate baffles on the upper side of the nosecone and the lower side of the nosecone;
    wherein the apparatus comprises at least three relief outlet plates which can be inserted or removed from a central open area in the eyeplate, said central open area being defined by a generally rectangular shaped plate which can be readily inserted or removed from the eyeplate apparatus, said at least three relief outlet plates being aligned in spaced intervals within the generally rectangular shaped plate to define at least two extrusion outlets, and wherein one of the relief outlet plates is located between the two extrusion outlets;
    wherein the relief outlet plate on said eyeplate is a column-like plate having a slot or an outlet which is centrally located and which runs along a length of the column-like plate from top to bottom;
    wherein the section of the walls defining either side of the slot or outlet on the relief outlet plate and which are immediately proximate to the slot are alternately tapered and straight.

2. An eyeplate apparatus comprising at least three relief outlet plates which can be inserted or removed from a central open area in the eyeplate, said central open area being defined by a generally rectangular shaped plate which can be readily inserted or removed from the eyeplate apparatus, said at least three relief outlet plates being aligned in spaced intervals within the generally rectangular shaped plate to define at least two extrusion outlets, and wherein one of the relief outlet plates is located between the two extrusion outlets;
    wherein each of said relief outlet plates are column-like plates having a slot or an outlet which is centrally located and which runs along a length of the column-like plate from top to bottom; and
    wherein each of said relief outlet plates has walls, the width of which walls is defined by an outside edge which is furthest from the slot or outlet and juts out the furthest and by an inside edge located approximate to the slot or outlet and is furthest in;
    wherein said walls are tapered to slope inwards from the outside jutted edge to the outlet; and wherein the section of the walls defining either side of the slot or outlet on the relief outlet plate and which are immediately proximate to the slot are alternately tapered and straight.

3. An eyeplate apparatus according to claim 2 wherein said slot or outlet has a width from about 1/32 to ½ inch.

4. An eyeplate apparatus according to claim 3, wherein the slot or outlet has a width of about ⅛ inch.

5. An eyeplate apparatus according to claim 2, wherein said outside edge on said wall has a width ranging from 1/64 to ½ inch.

6. An eyeplate apparatus according to claim 5, wherein said outside edge has a width of about 1/16 inch.

7. A relief outlet plate for use in an eyeplate apparatus comprising a column-like plate having a slot or an outlet which is centrally located and which runs along a length of the column-like plate from top to bottom;
    wherein said relief outlet plate has walls, the width of which walls is defined by an outside edge which is furthest from the slot or outlet and juts out the furthest and by an inside edge located approximate to the slot or outlet and is furthest in;
    wherein said walls are tapered to slope inwards from the outside jutted edge to the outlet; and
    wherein the section of the walls defining either side of the slot or outlet on the relief outlet plate and which are immediately proximate to the slot are alternately tapered and straight.

8. A relief outlet plate according to claim 7, wherein said slot or outlet has a width from about 1/32 to ½ inch.

9. A relief outlet plate according to claim 8, wherein the slot or outlet has a width of about ⅛ inch.

10. A relief outlet plate according to claim 7, wherein said outside edge on said wall has a width ranging from 1/64 to ½ inch.

11. A relief outlet plate according to claim 10, wherein said outside edge has a width of about 1/16 inch.

* * * * *